: 3,417,004
PRODUCTION OF ALUMINUM, MAGNESIUM, AND NICKEL FLUORIDE FILMS BY ANODIZATION
Charles C. Houtz, Bernardsville, and William McMahon, Summit, N.J., assignors to Bell Telephone Laboratories, Incorporated, New York, N.Y., a corporation of New York
No Drawing. Filed Mar. 24, 1966, Ser. No. 536,977
1 Claim. (Cl. 204—14)

This invention relates to an electrolytic technique for producing on certain metals fluoride films of the same metal, most particularly aluminum, but also magnesium and nickel.

Anodization of aluminum for producing a protective oxide coating has been used in a variety of important commercial applications. Since thin oxide films of this type have good dielectric properties they have been used in the electrical industry notably as capacitor dielectrics. With the increasing interest in aluminum as an electrical conductor, methods for producing mechanically sound, insulating coatings on aluminum have become important.

A particularly useful dielectric coating for aluminum was discovered several years ago and is described and claimed in United States Patent 3,028,447 issued Apr. 3, 1962, to S. S. Flaschen and P. D. Garn. This coating is aluminum fluoride which possesses exceptional dielectric strength over wide temperature ranges. It is relatively inert, nonporous, flexible and strongly adherent.

The method for forming aluminum fluoride coatings on aluminum conductors as described in the aforementioned patent involves the direct contact of the aluminum surface with fluorine gas at elevated temperatures. Although useful fluoride films are obtainable in this manner, the method has obvious disadvantages. It requires elaborate equipment and is hazardous. The choice of substrates is limited to materials that are unaffected by hot fluorine gas. Furthermore, control of the thickness and uniformity is difficult.

This invention is directed particularly to a superior method for producing aluminum fluoride coatings on aluminum surfaces. Although the method is also applicable to other metals the method involves essentially the anodization of the metal body being coated in a nonaqueous electrolyte of pyridine-pyridine hydrofluoride.

The following specific embodiment of the invention is given by way of example.

Several sheets of high-purity aluminum were die cut into coupons approximately three-quarters of an inch square with a tab extending from one corner for suspending the coupon in the electrolyte. The coupons were degreased in boiling benzene and washed in detergent. The same coupons were used as both anodes and cathodes.

The electrolytic cell used was a Teflon beaker and the aluminum anodes and cathodes were suspended from a slotted Teflon block. The cathodes were spaced one-quarter inch from the anodes. The electrolyte was a 0.011 mol percent solution of pyridine hydrofluoride in pyridine. It was found that concentrations ranging from 0.002 to 0.05 mol percent are particularly useful. Since it is important to avoid water in the electrolyte the electrolysis should be conducted in a dry atmosphere. A Teflon coated magnetic stirrer was used to avoid localized ion depletion of the electrolyte. The anodizing current density ranged between 0.08 ma./cm.$^2$ to 1.32 ma./cm.$^2$ for several samples prepared. The voltage typically increases from 10 to 15 volts to over 200 volts as the electrolyte becomes depleted. A satisfactory range of current densities is prescribed by the range 0.05 ma./cm.$^2$ to 2 ma./cm.$^2$. At current densities lower than this range the anodization rate becomes quite slow. Current densities higher than 2 ma./cm.$^2$ deplete the electrolyte in a relatively few minutes and the anodization is nonuniform and difficult to control. The film thickness constant is approximately 9450 A. per coulomb/cm.$^2$ so that the anodization rate in the foregoing examples ranged from approximately 45 A./min. to about 750 A./min. The film does not form a barrier layer during anodization so that the film thickness is not self-limiting. This indicates that the film is nonpolar which is an important and desirable property, especially for capacitor applications. For most applications film thicknesses will be in the range of 500 A. to 50,000 A.

The aluminum fluoride films produced in this manner are optically transparent and colorless and are completely invisible to the eye unless very thin, in which case interference colors are visible.

While such films may serve a variety of uses the applications of principal interest are electrical. As noted above aluminum oxide coatings have been used in thin film capacitors. However, these anodized films are polar so that in A–C applications two capacitors must be used in series back-to-back. Consequently, even though these capacitors have a very large ratio of capacitance-to-volume, some of the size advantage is lost. The dissipation factor of aluminum oxide capacitor is high and shows a large dependence on temperature and frequency. Capacitance exhibits an undesirable dependence on the latter factors also.

The aluminum fluoride films produced by the anodization process of this invention were evaluated in terms of their electrical characteristics to give a basis for comparison to the prior art oxide films.

Counterelectrodes were applied in the conventional manner to several samples for measurement of capacitor characteristics. The following properties were found.

The dielectric constant is of the order of 10. Temperature coefficient of capacitance is nearly linear over the temperature range from −70° C. to 165° C. and is approximately +220 p.p.m. per degree C. The film is essentially nonpolar and has a resistivity in excess of 100 megohm-microfarads. If an evaporated metal counterelectrode is used the film exhibits self-healing in the manner of plastic film and oxide film dielectrics. Isolation or removal of conducting spots occurs by capacitor discharge burnout. The film adheres well and is not degraded by exposure to temperatures between −70° C. and 200° C. It is not damaged by immersion in boiling water nor by aqueous ion hydrolysis.

Nickel fluoride films and magnesium fluoride films were prepared in essentially an identical manner. The magnesium films exhibited barrier layers on nickel and magnesium anodes. The dielectric properties of sample films prepared by this method are given in the following table.

TABLE I

| Metal | Counter-electrode | Capacitance (Pf.) | Capacitance (Pf./cm.²) | Dissipation factor | Insulation resistance (MEG-UF) |
|---|---|---|---|---|---|
| Dried over P₂O₅ at room temperature | | | | | |
| NI | Small | 2,722 | 39,000 | .078 | .019 |
| NI | Medium | 11,215 | 39,950 | .075 | .003 |
| NI | Large | 31,623 | 39,750 | .23 | .001 |
| MG | Medium | 10,656 | 37,900 | .073 | .32 |
| Dried 16 hours in vacuum at 235° C. | | | | | |
| MG | Medium | 8,276 | 29,450 | .015 | >8 |
| Dried 16 hours in vacuum at 205° C. | | | | | |
| NI | Small | 2,514 | 36,000 | .033 | 1.25 |
| NI | Medium | 10,331 | 36,750 | .045 | .06 |
| NI | Large | 28,743 | 36,100 | .030 | .14 |

Various additional modifications and extensions of this invention will become apparent to those skilled in the art. All such variations and deviations which basically rely on the teachings through which this invention has advanced the art are properly considered within the spirit and scope of this invention.

What is claimed is:

1. A method for forming a fluoride film of a metal selected from the group consisting of aluminum, nickel and magnesium on a substrate of the same metal which comprises anodizing the metal substrate in a substantially non-aqueous solution of pyridine-hydrofluoride and pyridine at a current density in the range of .01 ma./cm.² to 2 ma./cm.².

References Cited

UNITED STATES PATENTS

| 1,574,289 | 2/1926 | Keeler | 204—56 |
| 2,229,252 | 1/1941 | Michel et al. | 204—56 |
| 2,313,753 | 3/1943 | Loose | 204—56 XR |
| 3,028,447 | 4/1962 | Flaschen et al. | 174—113 |

FOREIGN PATENTS

| 671,314 | 2/1939 | Germany. |
| 677,001 | 6/1939 | Germany. |

HOWARD S. WILLIAMS, *Primary Examiner.*

G. KAPLAN, *Assistant Examiner.*